United States Patent [19]
Kranig et al.

[11] Patent Number: 6,090,866
[45] Date of Patent: *Jul. 18, 2000

[54] ACRYLATED POLYETHER POLYOL AND THE USE THEREOF FOR RADIATION-CURABLE FORMULATIONS

[75] Inventors: Wolfgang Kranig, Senden; Martin Lobert, Osnabrück, both of Germany

[73] Assignee: BASF Coatings Aktiengesellschaft, Muenster-Hiltrup, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/043,934

[22] PCT Filed: Sep. 26, 1996

[86] PCT No.: PCT/EP96/04199

§ 371 Date: May 1, 1998

§ 102(e) Date: May 1, 1998

[87] PCT Pub. No.: WO97/11982

PCT Pub. Date: Apr. 3, 1997

[30] Foreign Application Priority Data

Sep. 27, 1995 [DE] Germany ............... 195 35 936

[51] Int. Cl.[7] .................................................. C08G 18/67
[52] U.S. Cl. ........................... 522/96; 522/46; 522/100; 526/320
[58] Field of Search ................ 522/46, 96, 100; 526/320; 427/519, 508, 385.5, 386; 252/182.18; 560/224

[56] References Cited

U.S. PATENT DOCUMENTS

| | | | |
|---|---|---|---|
| 2,759,913 | 8/1956 | Hulse | 260/89.7 |
| 3,380,831 | 4/1968 | Cohen | 560/224 |
| 4,180,474 | 12/1979 | Schuster et al. | 204/159.23 |
| 4,382,135 | 5/1983 | Sinka et al. | 526/301 |
| 5,146,531 | 9/1992 | Shustack . | |
| 5,441,775 | 8/1995 | Beck et al. | 427/496 |
| 5,496,589 | 3/1996 | Igarashi et al. | 427/331 |
| 5,738,971 | 4/1998 | Suzuki et al. | 430/263 |

FOREIGN PATENT DOCUMENTS

| | | | |
|---|---|---|---|
| 0 047 499 B1 | 9/1981 | European Pat. Off. | B60L 11/04 |
| WO 90/06289 | 11/1989 | European Pat. Off. | C03C 25/02 |
| 0 586 849 A2 | 7/1993 | European Pat. Off. | C09D 4/00 |
| 26 25 538 C2 | 12/1977 | Germany | C09D 3/48 |
| 23 46 424 C2 | 12/1986 | Germany | C07C 101/28 |
| 43 26 772 A1 | 8/1993 | Germany | C08F 220/26 |
| 44 10 014 A1 | 3/1994 | Germany | C08F 20/28 |
| 44 31 773 A1 | 9/1994 | Germany | C08F 20/28 |
| 07149849 | 6/1995 | Japan | C08F 290/06 |

OTHER PUBLICATIONS

F. Möller, Houben–Weyl, Stickstoff–Verbindungen II; vol. Nov. 1, 1995, pp. 277–280.

*Primary Examiner*—Rachel Gorr

[57] ABSTRACT

The present invention relates to an acrylicized polyether-polyol that consists of an ethoxylated polyol having a molecular weight of from 600 to 1000, preferably from 700 to 900, which is esterified with acrylic acid.

10 Claims, No Drawings

ACRYLATED POLYETHER POLYOL AND THE USE THEREOF FOR RADIATION-CURABLE FORMULATIONS

BACKGROUND OF THE INVENTION

The present invention relates to a novel acrylicized polyetherpolyol which can be used in particular for radiation-curable coating compositions.

It is known to cure compositions based on acrylic esters by means of radiation, especially UV radiation. Here, however, a problem which arises is that the presence of air in the course of curing, especially the curing of surfaces, is disruptive.

DE-C 2625538 discloses photopolymerizable coating compositions comprising amines as reducing agents and chain-transfer compounds. The use of a free amine of this kind has the disadvantage that it may act as a plasticizer, and leads to an unwanted deposit on the surface.

By incorporating the amino group into a molecule which also includes polymerizable groups, a copolymerized amine is obtained which does not have the abovementioned disadvantages. A known method of incorporation is the adding of amines onto double bond-rich molecules, which proceeds in the manner of a Michael addition and is described, for example, in F. Möller, Houben-Weyl, Vol. 11/1 (1957), pp. 277–280. U.S. Pat. No. 2,759,913 teaches the addition of amines onto activated, olefinically unsaturated compounds, such as acrylates in equimolar amounts, which leads to the complete reaction of the activated ethylenic double bonds. Systematic investigations into the addition of amino alcohols onto acrylates have been carried out by Ogata. Bull. Chem. Soc. Jap. 39, pages 1486–1490, 1966.

DE-C 2 346 424 describes the preparation of radiation-curable compositions starting from acrylic esters of polyhydric alcohols and from secondary, aliphatic monofunctional amines. These compositions have the disadvantage of reduced stability on storage. The adding-on of a secondary amine, moreover, leads to a reduction in the acrylic ester functionality of the molecule and hence also to a reduction in the crosslinking possibilities for radiation-induced polymerization.

EP Application 0280222 discloses adducts of acrylic esters and a polyhydric alcohol with a primary monoamine, which are used for radiation-curable coating compositions.

EP-B 0586849, furthermore, discloses amino acrylates having a viscosity of from 2000 to 3000 mPas, a content of olefin double bonds of from 8 to 20% by weight and a nitrogen content of from 0.4 to 2.0% by weight, which can be employed as binders for radiation-curable coating compositions.

The disadvantage of the said products lies in the tendency towards yellowing, especially of the amine-modified polyether acrylates.

SUMMARY OF THE INVENTION

The present invention has now set itself the object of providing an acrylicized polyetherpolyol which can be used in radiation-curable coating formulations and does not have the abovementioned disadvantages.

This object is achieved in that the acrylicized polyetherpolyol consists of an ethoxylated polyol having a molecular weight of from 500 to 1000, preferably from 700 to 900, which is esterified with acrylic acid.

DETAILED DESCRIPTION OF THE INVENTION

The polyether acrylate of the invention consists, in a preferred embodiment, of from 50 to 75% by weight, preferably from 55 to 65% by weight of a polyetherpolyol, from 20 to 50% by weight, preferably from 30 to 45% by weight of acrylic acid and 5% by weight of customary auxiliaries.

The ether alcohols employed generally have a degree of ethoxylation of from 10 to 20, preferably from 13 to 17, the degree of ethoxylation indicating the number of moles of ethylene oxide that have on average been added onto 1 mol of an alcohol used as the starter molecule. Particular preference is given to the use of ethoxylated 3- or 4-hydric alcohols having a degree of ethoxylation of from 3 to 6 and a molecular weight of from 224 to 400. Ethoxylated erythritol having a molecular weight of from 500 to 1000, preferably from 700 to 900, is preferably employed. One example is pentaerythritol etherified with 15 ethoxy units.

The polyetherpolyols concerned are preferably those having an OH number of from 150 to 350 mg of KOH/g, preferably from 250 to 320, and a viscosity of from 300 to 1000, preferably from 400 to 600 mPa·s at 23° C.

The hydroxyl-containing polyethers, which are esterified with acrylic acid and/or methacrylic acid, are obtained by the reaction of the dihydric and/or higher polyhydric alcohols with various amounts of ethylene oxide in accordance with well-known methods (cf. e.g. Houben-Weyl, Vol. XIV, 2, Makromolekulare Stoffe II, (1963).

Alcohols comprising ether groups are substantially free from propylene oxide units $—CH_2—CH(CH_3)—O—$. This means that in the alkoxylation reaction only minor amounts, if any, of propylene oxide are used in addition to ethylene oxide (molar ratio of ethylene oxide to propylene oxide at least 5:1).

The acrylized polyetherpolyol according to the invention may be modified with amines, preferably ethanolamine, dimethylaminopropylamine or mixtures thereof.

The present invention also relates to a process for preparing an acrylicized polyetherpolyol which is suitable for use, in particular, in radiation-curable formulations. In this process polyetherpolyol and acrylic acid are first of all heated to from 70 to 110° C., preferably from 80 to 100° C., in the presence of an entrainer. Entrainers that are suitable in this context are only those substances whose boiling points lie between 60 and 110° C., preferably between 70 and 90° C. This temperature is maintained until the acid number falls below 60 to 80, preferably 65 to 75. The proportions of the polyetherpolyol are normally from 50 to 75% by weight, preferably from 55 to 65% by weight. The acrylic acid is added in amounts of from 20 to 60% by weight, preferably from 30 to 45% by weight. In addition, polymerization inhibitors, e.g. hydroquinones, catalysts to accelerate the esterification reaction, and antioxidants are added to the mixture.

As soon as the acid number has reached the desired value acrylic acid is added again, in an amount of from 1.5 to 5, preferably from 2 to 3% by weight, until the acid number has fallen below 40, preferably below 35. Subsequently, a vacuum is applied until the acid number has fallen below 20, preferably below 15, and a viscosity of from 1 to 8 has been established, preferably from 2 to 6 and, with particular preference, from 3 to 4.5 mPa·s at 23° C. The reaction is continued until the acid number has fallen below 40, preferably below 35.

The acrylicized polyetherpolyol prepared in this way now contains residual acrylic acid and entrainer, which are removed together in vacuo at temperatures from 110 to 130° C.

The acrylicized polyetherpolyol of the invention is particularly suitable for radiation-curable coating compositions.

These compositions may consist, for example, of from 40 to 90% by weight, preferably from 50 to 60% by weight of urethane acrylate, from 0 to 20% by weight, preferably from 10 to 15% by weight of polyether acrylate, from 10 to 50% by weight, preferably from 25 to 40% by weight of reactive diluent, from 0 to 10% by weight, preferably from 3 to 6% by weight of photoinitiator, from 0 to 30% by weight of pigments and from 0 to 10% by weight of further customary coatings fillers.

In this context the urethane acrylates consist preferably of from 30 to 45% by weight of polyesters, with very particular preference from 30 to 40% by weight, from 0.01 to 0.1% by weight of catalysts, from 0.05 to 0.1% by weight of stabilizers, from 10 to 20, preferably from 15 to 20% by weight of hydroxyethyl acrylate, from 15 to 25, preferably from 15 to 20% by weight of reactive diluent and from 20 to 35, preferably from 25 to 35% by weight of a diisocyanate component.

The polyesters employed consist of from 50 to 75% by weight, preferably from 55 to 65% by weight of alcohol and from 20 to 50, preferably from 30 to 45% by weight of acid and also 5% by weight of customary auxiliaries.

The preparation of the hydroxyl-containing polyester resins takes place in a known manner by esterifying polybasic carboxylic acids with polyhydric alcohols in the presence of appropriate catalysts. Instead of the free acid it is also possible to employ its ester-forming derivatives. Alcohols suitable for the preparation of polyesters are, for example, ethylene glycol, 1,2-propylene glycol, 1,3-propylene glycol, 1,2-butanediol 1,3-butanediol, 1,4-butanediol, 1,5-pentanediol, neopentyl glycol, diethylene glycol, triethylene glycol, and also triols, such as glycerol, trimethylolethane, trimethylolpropane and tris-2-hydroxyethyl isocyanurate, for example.

It is also possible to employ cycloaliphatic alcohols, such as cyclohexanols and 1,4-bis(hydroxy-methyl)cyclohexane, aromatic alcohols, such as 1,3-xylylenediol, and also phenols, such as 2,2-bis(4-hydroxyphenyl)propane (bisphenol A).

Preference is given to the use of mixtures of trimethylolpropane, triethylene glycol and cyclohexanedimethanol.

Also suitable are dihydric aliphatic alcohols, such as 1,4-hexanediol, 1,6-hexanediol, 2-methyl-1,5-pentanediol, 2-ethyl-1,4-butanediol, dimethylolcyclohexane, trihydric alcohols, such as trimethylolbutane, tetrahydric alcohols, such as pentaerythritol, and more highly polyhydric alcohols, such as di(trimethylolpropane), di(pentaerythritol) and sorbitol.

Examples of suitable carboxylic acids are phthalic acid, isophthalic acid, terephthalic acid and the esterifiable derivatives thereof, such as the anhydrides provided they exist, for example, and the lower alkyl esters of these acids, such as, for example, methyl, ethyl, propyl, butyl, amyl, hexyl and octyl phthalates, terephthalates and isophthalates. The monoesters, the dialkyl esters and mixtures of these compounds can all be employed. Also employable are the corresponding acid halides of these compounds. Preference is given to mixtures of phthalic anhydride, isophthalic acid and adipic acid.

Aliphatic and/or cycloaliphatic diisocyanates are suitable for preparing the urethane acrylate, examples being 1,3-cyclopentane, 1,4-cyclohexane and 1,2-cyclohexane diisocyanate, 4,4'-methylene-bis(cyclohexyl isocyanate) and isophorone diisocyanate, trimethylene, tetramethylene, pentamethylene, hexamethylene and trimethylhexamethylene 1,6-diisocyanate, and also the diisocyanates that are described in EP-A-204 161, column 4, lines 42 to 49 and are derived from dimeric fatty acids. Preferably, isophorone diisocyanate is added onto the hydroxy-functional polyester.

The polyurethane acrylates and/or methacrylates are obtained by addition of hydroxyl-containing acrylic esters and/or methacrylic esters, such as hydroxyethyl acrylate or hydroxybutyl acrylate, onto mono- and/or oligomers that contain isocyanate groups. So that no unwanted polymerization takes place in the course of the addition reaction, polymerization inhibitors as stabilizers are generally added to the reaction mixture. Suitable polymerization inhibitors include known products, such as substituted phenols, such as 2,6-di-tert-butyl-p-cresol, hydroquinones, such as methylhydroquinones, and thiol ethers, such as thiodiglycol or phenothiazine.

Depending on the viscosity of the esters the radiation-curable coating compositions may comprise reactive diluents, preferably copolymerizable compounds known for use in radiation-curable coating compositions, for example (meth)acrylic esters, especially methyl (meth)acrylate, ethyl (meth)acrylate, propyl (meth)acrylate, butyl (meth)acrylate, isopropyl (meth)acrylate, pentyl (meth)acrylate, isoamyl (meth)acrylate, hexyl (meth)acrylate, cyclohexyl (meth) acrylate, 2-ethylhexyl (meth)acrylate, octyl (meth)acrylate, 3,5,5-trimethylhexyl (meth)acrylate, decyl (meth)acrylate, hexadecyl (meth)acrylate, octadecyl (meth)acrylate, octadecenyl (meth)acrylate, phenoxy-ethyl acrylate and also the corresponding esters of maleic, fumaric, tetrahydrophthalic, crotonic, isocrotonic, vinylacetic and itaconic acid. It is preferred to employ monomers having more than one double bond per molecule, examples being ethylene glycol diacrylate diethylene glycol diacrylate, propylene glycol diacrylate, trimethylene glycol diacrylate, neopentyl glycol diacrylate, 1,3 butylane [sic] glycol diacrylate, 1,4-butylene glycol diacrylate, 1,6-hexamethylene glycol diacrylate, 1,10decamethylene [sic] glycol ddiacrylate [sic], trimethylolpropane ttriacrylate [sic], pentaerythritol tetraacrylate and pentaerythritol tetraacrylate [sic] and also the corresponding methacrylates. Also suitable are the ethoxylated or propoxylated derivatives, and the long-chain linear diacrylates described in EP-A-250 631 which have a molecular weight of from 400 to 4000, preferably from 600 to 2500. The two acrylate groups can be separated, for example, by a polyoxybutylene structure. It is possible, moreover, to employ 1,12-dodecyl diacrylate and the reaction product of 2 mol of acrylic acid with 1 mol of a dimeric fatty alcohol which generally has 36 C atoms. Very particular preference is given to the use of isobornyl acrylate, trimethylolpropane triacrylate and acrylic esters of ethoxylated pentaerythritol.

The addition of this ethylenically unsaturated compound regulates the viscosity and the curing rate of the coating compositions and also the mechanical properties of the resulting coating, as is familiar to the skilled worker and is described, for example, in EP-A-223 086, to which reference is made for further details.

The photoinitiator, which is normally employed in the coating compositions in an amount of from 0 to 10% by weight, preferably from 3 to 6% by weight, based on the overall weight of the coating compositions, varies with the radiation that is employed to cure the coating compositions (UV radiation, electron beams, visible light). The coating compositions of the invention are preferably cured by means of UV radiation. In this case it is common to employ ketone-based photoinitiators, examples of which are acetophenone, benzophenone, diethoxyacetophenone, 2-hydroxy-2-methyl-phenylpropan-1-one, hydroxypropyl phenyl ketone, m-chloroacetophenone, propiophenone, benzoin, benzil, benzil dimethyl ketal, anthraquinone, thioxanthone and thioxanthone derivatives and triphenylphosphine and the like, and also mixtures of various photoinitiators.

The coating compositions may in addition, if desired, comprise pigments and customary coatings fillers, customary auxiliaries and additives. The former are employed in amounts of from 0 to 30% by weight. The proportion of customary coatings fillers is from 0 to 10% by weight. Auxiliaries and additives are normally employed in an amount of from 0 to 4% by weight, preferably from 0.5 to 2.0% by weight, based in each case on the overall weight of the coating composition. Examples of substances of this type are leveling agents, plasticizers (e.g. extenders, such as talc, heavy spar, aluminum silicate, dolomite, defoamers and film-forming auxiliaries, e.g. cellulose derivatives, matting agents in customary amounts) and also, in particular, adhesion promoters. Adhesion promoters employed here are alkoxysilanes, such as, for example, N-β-aminoethyl-, -aminopropyltrimethoxysilane, -aminopropyltrimethoxysilane [sic], N-methyl-β-aminopropyltrimethoxysilane or triamino-modified propyltrimethoxysilane (e.g. adhesion promoter DYNASLYAN$^R$ [sic], "type TRIAMO", commercial product of Dynamit Nobel Chemie).

As additional adhesion promoters it is possible to use from 0 to 10, preferably from 2 to 5% by weight of a carboxy-functional (meth)acrylic ester. Examples are β-carboxyethyl acrylate and EBECRYL 169 or 170, which can be obtained from UCB, S.A., Drogenbos, Belgium.

The curing of the coating films is carried out by means of radiation, preferably by means of electron beams. The equipment and conditions for these curing methods are known from the literature (cf. e.g. R. Holmes, U.V. and E.B. Curing Formulations für [sic] Printing Inks, Coatings and Paints, SITA Technology, Academic Press, London, United Kingdom 1984) and require no further description.

The curing of the coating films takes place directly following application or after the evaporation of water that is present by means of UV or electron beams. The equipment and conditions for these curing methods are known from the literature (cf. e.g. R. Holmes, U.V. and E.B. Curing Formulations for Printing Inks, Coatings and Paints, SITA-Technology, Academic Press, London, United Kingdom 1984, pages 79–111) and require no further description.

In the coating formulations based on urethane acrylate that are described, the use of the acrylicized polyetherpolyol of the invention leads in particular to properties not hitherto achieved with other formulations. In particular, tensile strength and elongation at break can be controlled within wide ranges without substantially affecting the other properties of the coating film (reactivity, chemical resistance, surface quality). The acrylicized polyetherpolyol can be diluted homogeneously with water to 50% and hence permits sprayable aqueous coating materials which after the water has evaporated can be cured using electron beams or UV radiation. The values obtained so far in this case show a significant improvement over binders customary on the market to date.

In the text below the invention is described in more detail with reference to the examples:

A. PREPARING THE POLYETHER ACRYLATE 64.9 parts of polyetherpolyol, 23.519 parts by weight of acrylic acid, 0.547 parts by weight of p-toluenesulfonic acid, 0.180 parts by weight of hydroquinone, 0.180 parts by weight of hypophosphorous acid and 8 parts by weight of cyclohexane are weighed out and heated to 85° C. This temperature is retained until the acid number of the reaction mixture falls below 70. Subsequently, 2.352 parts by weight of acrylic acid and 0.3 parts by weight of cyclohexane are added and the reaction is continued until the acid number falls below 35. Subsequently, a vacuum is applied and is maintained until the acid number has fallen below 8 and the viscosity is from 2.5 to 3.5 mpa·s.

B. PREPARING THE URETHANE ACRYLATE

1st stage: A polyester having an OH number of approximately 210 is prepared by weighing out 6.40 parts by weight of trimethylolpropane, 19.787 parts by weight of triglycol, 33.381 parts by weight of cyclohexane-dimethanol, 13.007 parts by weight of phthalic anhydride, 14.588 parts by weight of isophthalic acid and 12.831 parts by weight of adipic acid. A condensation reaction is conducted at 240° C. until the following characteristic data are achieved:
Acid number from 3 to 5
Viscosity from 3.5 to 5.0 mPa·s
Cone-and-plate viscosity at 23° C. 70% strength in methoxypropanol 2nd stage: 34.139 parts by weight of the polyester prepared in stage 1 are weighed out together with 0.039 parts by weight of dibutyltin dilaurate, 0.078 parts by weight of di-tert-butyl-p-cresol, 15 parts by weight of hydroxyethyl acrylate, 21.956 parts by weight of phenoxyethyl acrylate, 30 ppm of phenothiazine, and this mixture is heated to 60° C. 28.707 ppm of isophorone diisocyanate and 0.080 ppm of ethanol are metered in such that the temperature remains below 65° C. The mixture is held at 60° C. until the NCO content falls below 1.5%. It is then heated at 90° C until the NCO content has fallen below 0.1%.

C. EXAMPLES OF COATING MATERIALS

Example 1

Free coating film 39.8 parts of aromatic urethane acrylate, 80% strength in phenoxyethyl acrylate, 20 parts of acrylicized polyetherpolyol, 14.8 parts of isobornyl acrylate, 24.8 parts of titanium dioxide, 0.3 parts of emulsifier (Tween 80), 0.3 parts of dispersing auxiliary.

Example 2

Free coating film 39.8 parts of aromatic urethane acrylate, 80% strength in phenoxyethyl acrylate, 10 parts of acrylicized polyetherpolyol, 14.8 parts of isobornyl acrylate, 10 parts of ethoxylated pentaerythritol tetracrylate [sic] SR 494 (Cray Valley) 24.8 parts of titanium dioxide, 0.3 parts of emulsifier (Tween 80), 0.3 parts of dispersing auxiliary.

Example 3

Free coating film 39.8 parts of aromatic urethane acrylate, 80% strength in phenoxyethyl acrylate, 1.0 parts of acrylicized polyetherpolyol, 14.8 parts of isobornyl acrylate, 19.0 p arts of ethoxylated pentaerythritol ethacrylate [sic] SR 494 (Cray Valley) 24.8 parts of titanium dioxide, 0.3 parts of emulsifier (Tween 80), 0.3 parts of dispersing auxiliary.

The components are weighed out into the containers customary in the coatings industry and are combined using a dissolver.

Mechanical properties of the coatings of Examples 1 to 3

| Example (%) | Tensile strength (N/mm$^2$) | Elongation at break |
|---|---|---|
| 1 | 10 | 24 |
| 2 | 15 | 15 |
| 3 | 25 | 9 |

Using the acrylicized polyetherpolyol described, the tensile strength and elongation at break can be controlled within wide ranges without substantially affecting the other coating-film properties (reactivity, chemical resistance, surface smoothness).

Example 4

Spray coating material 50 parts of acrylicized polyetherpolyol, 48 parts of water, 2 parts of Irgacure 500 (photoinitiator, Ciba Geigy).

The coating material exhibits good sprayability at room temperature and also an excellent pore pattern on wood and veneer.

Example 5

Clearcoat 96 parts of acrylicized polyetherpolyol, 4 parts I. 500

The coating material exhibits an excellent weathering stability.

What is claimed is:

1. A radiation curable coating comprising
   a) 40–90% by weight of a polyurethaneacrylate,
   b) 10–20% by weight of a polyetheracrylate,
   c) 10–50% by weight of one or more reactive diluents,
   d) 0–10% by weight of photo-intiator,
   e) 0–30% by weight of pigments and
   f) 0–10% by weight of fillers,
   wherein the polyetheracrylate consists of an ethoxylated polyol having a molecular weight of from 600 to 1000 and is esterified with acrylic acid.

2. The radiation curable coating of claim 1, wherein the polyol is 10 to 20-fold ethoxylated.

3. The radiation curable coating of claim 2, wherein the polyol is 13 to 17-fold ethoxylated.

4. The radiation curable coating of claim 1, wherein the polyetheracrylate consists of 50 to 75% by weight of polyetherpolyol, 20 to 50% by weight of acrylic acid, and 0 to 5% by weight of auxiliaries.

5. The radiation curable coating of claim 4, wherein the polyetheracrylate consists of 55 to 65% by weight of polyetherpolyol and 20 to 50% by weight of acrylic acid.

6. The radiation curable coating of claim 1, wherein the polyetherpolyol consists of ethoxylated pentaerythritol.

7. The radiation curable coating of claim 1, wherein the polyetheracrylate is modified with amine.

8. The radiation curable coating of claim 7, wherein the polyetheracrylate is modified with an amine selected from the group consisting of ethanolamine, dimethylaminopropylamine and mixtures thereof.

9. The radiation curable coating of claim 1, further comprising UV-initiators based on ketones.

10. The radiation curable coating of claim 9, comprising benzophenone as a UV-initiator.

* * * * *